United States Patent
Sentagnes et al.

(10) Patent No.: US 6,551,517 B1
(45) Date of Patent: Apr. 22, 2003

(54) METHOD FOR TRANSFORMING CHEMICAL STRUCTURES IN A FLUID UNDER PRESSURE AND IN HIGH TEMPERATURE

(75) Inventors: Dominique Sentagnes, Leb, rue de Soissons, f-33000 Bordeaux (FR); Cyril Aymonier, Fertans (FR); Bernard Berdeu, Villenave D'Ornon (FR); François Cansell, Pessac (FR)

(73) Assignees: L'Electrolyse, Latresne (FR); Dominique Sentagnes, Bordeaux (FR)

( * ) Notice: Subject to any disclaimer, the term of this patent is extended or adjusted under 35 U.S.C. 154(b) by 0 days.

(21) Appl. No.: 09/720,256

(22) PCT Filed: Jul. 9, 1999

(86) PCT No.: PCT/FR99/01681

§ 371 (c)(1),
(2), (4) Date: Jan. 9, 2001

(87) PCT Pub. No.: WO00/02820

PCT Pub. Date: Jan. 20, 2000

(30) Foreign Application Priority Data

Jul. 10, 1998 (FR) .............................................. 98 08923

(51) Int. Cl.$^7$ .................................................. C02F 1/36
(52) U.S. Cl. ..................... 210/719; 205/755; 205/756; 210/721; 210/737; 210/748; 210/757; 210/758; 210/759; 210/761; 210/762; 422/184.1; 422/186; 588/210; 588/212; 588/219; 588/222; 588/227; 588/237
(58) Field of Search ................................ 210/719, 721, 210/737, 748, 757, 758, 761, 762, 766, 759; 422/184.1, 186; 588/208, 210, 212, 219, 222, 225, 226, 227, 233, 237, 239, 243, 247; 205/755, 756

(56) References Cited

U.S. PATENT DOCUMENTS

| | | | |
|---|---|---|---|
| 3,606,999 A | * | 9/1971 | Lawless ........................ 166/59 |
| 4,380,960 A | | 4/1983 | Dickinson .................... 110/347 |
| 4,581,105 A | | 4/1986 | Chao et al. ................... 204/1 R |
| 4,793,919 A | * | 12/1988 | McCorquodale ............ 210/177 |
| 4,822,497 A | | 4/1989 | Hong et al. .................. 210/721 |
| 4,861,497 A | | 8/1989 | Welch et al. ................ 210/759 |
| 5,100,560 A | | 3/1992 | Huang .......................... 210/721 |
| 5,252,224 A | | 10/1993 | Modell et al. ............... 210/695 |
| 5,370,801 A | * | 12/1994 | Sorensen et al. ............ 210/742 |
| 5,387,398 A | | 2/1995 | Mueggenburg et al. ..... 422/168 |
| 5,543,057 A | | 8/1996 | Whiting et al. .............. 210/721 |
| 5,571,424 A | | 11/1996 | Ahluwalia .................... 210/761 |
| 5,914,031 A | * | 6/1999 | Sentagnes et al. ............. 208/13 |

FOREIGN PATENT DOCUMENTS

| | | |
|---|---|---|
| EP | 0 535 320 | 4/1993 |
| EP | 0 708 058 | 4/1996 |
| WO | WO 92/21621 | 12/1992 |
| WO | WO 93/02969 | 2/1993 |

* cited by examiner

Primary Examiner—Peter A. Hruskoci
(74) Attorney, Agent, or Firm—Oblon, Spivak, McClelland, Maier & Neustadt, P.C.

(57) ABSTRACT

The present invention relates to a process for converting chemical structures, that is to say a process for the conducting of chemical reactions in a fluid under pressure and at temperature in a supercritical fluid in particular, containing a solvent and at least one electrolyte such as a salt, in which reactive species are generated in situ by electrolysis. According to the invention, the fluid flows upwards in a reservoir reactor crossing through a first lower electrolysis zone with high salt solubility and a second upper zone in which the salts precipitate, then the fluid free of salt is evacuated at the upper part of said reservoir reactor and directed into a second tubular reactor to reach the desired stage of advancement of the conversion.

36 Claims, 1 Drawing Sheet

METHOD FOR TRANSFORMING CHEMICAL STRUCTURES IN A FLUID UNDER PRESSURE AND IN HIGH TEMPERATURE

DESCRIPTION

The present invention concerns a process for converting chemical structures, that is to say a process for conducting chemical reactions in a fluid under pressure and at temperature, in particular in a supercritical fluid, and a device for its implementation.

More precisely, the invention relates to a process for converting chemical structures, that is to say a process for conducting chemical reactions in a fluid under pressure and at temperature, in particular in a supercritical fluid, containing a solvent and at least on electrolyte such as a salt, in which reactive species are generated in situ by electrolysis.

The invention finds applications in widely varying fields. It may be applied, for example, to the modification of molecular structures, especially in molecular engineering or in pharmacology. It may also be applied to the degradation of industrial waste, for example the degradation of de-inking sludge or of metallic hydroxide sludge and to the treatment of all kinds of waste, aqueous waste in particular containing organic and mineral compounds for example, more particularly aqueous waste containing halogen compounds.

The invention may also be applied to the destruction of explosives or hazardous products, such as for example pesticides (polychlorobiphenyls). A further area of use is the recycling of natural substances such as for example liquid manure, vineyard waste and waste from milk treatment.

The processes used to conduct chemical reactions, in particular in a fluid medium under pressure and at temperature, especially a supercritical fluid, are generally conducted in equipment called reactors.

Among these reactors, the so-called tubular reactor, that is to say which is generally in cylindrical in shape whose length is distinctly greater than its diameter, is the easiest reactor to use, the most flexible and the least costly.

However, the use of these reactors is limited by problems related to salt deposits leading to blockage of the reactor and corrosion.

Tubular reactors have been the subject of numerous patents, among which mention may be made of the patents by N. L. DICKINSON: U.S. Pat. No. 4,380,960, by J. F. WELCH and J. D. SLEGWARTH: U.S. Pat. No. 4,861,497, by L.LI and E. F. GLOYNA. PCT/US 92 06459, or further by M.MODELL: U.S. Pat. No. 5,252,224.

All these patents aim at remedying the disadvantages of the tubular reactors mentioned above, however the solutions put forward based on the use of resistant materials that are difficult to apply at acceptable cost, the neutralisation of acids, or fluid speeds inside the tubular reactor greater than the critical speed of salt sedimentation, only bring an imperfect solution to the defects of tubular reactors.

The same applies to "porous wall" tubular reactors which are the subject of patents U.S. Pat. No. 5,387,398, U.S. Pat. No. 5,571,424 and EP-A-0 708 058, or mobile surface tubular reactors which are the subject of patent U.S. Pat. No. 5,543,057 TO which the salts adhere which are, moreover, of increased complexity both in respect of their manufacture and their operation.

Other reactors are so-called "reservoir reactors", that is to say reactors which generally have a low Length/Diameter ratio (L/D), in the region of 3 for example or less.

This type of reactor appears to be better suited than the tubular reactor to face the problems of salt precipitation and corrosion.

One reservoir reactor of the type operating in the supercritical domain is described in patent U.S. Pat. No. 4,822,497.

This reactor is formed of two zones: the upper part of the reactor being placed under supercritical conditions for water, namely at a temperature greater than 374° C., and the lower part of the reactor being placed under subcritical conditions, namely a temperature of less than 374° C.

Supply is fed via the top of the reactor in the supercritical zone, the site of the oxidation reaction. The salts, whose solubility varies between 1 ppb and. 100 ppm above 450° C. precipitate and fall together with the other solid particles down towards the lower part of the reactor.

This lower part, maintained under subcritical conditions, either through the injection of a cold liquid, or by a heat exchanger, makes it possible to resolubilize part of the mineral salts and to evacuate the brine that is formed. As for the fluid to be treated, this falls into the subcritical zone then moves up towards the outlet (supercritical zone) protected by a filter.

Two other patents also put forward improvements to this type of reactor: patent U.S. Pat. No. 5,100,560 describes the installation of a scraper inside the cylindrical chamber used to detach the salts which deposit on the inner wall of the reservoir reactor, and patent WO-92/21621 uses a curtain of water under subcritical conditions on the inner wall of the reactor in order to protect the latter against salt deposits and corrosion.

Reservoir reactors have the advantage of confining the solid/liquid reaction and separation within one same reactor: but they have the disadvantage in particular of requiring considerable volumes in order to obtain relatively long stay times so that the reactions can be completed, which has repercussions on the overall cost of the process.

Moreover, here again, these reservoir reactors only bring an imperfect solution to the problems of salt deposits and corrosion and it is necessary in particular to have recourse, for the manufacture of the reactor, to materials able to withstand such conditions, or to lining the reactor with the same resistant, costly materials such as titanium.

Moreover, the two types of reactors described above, whether tubular reactors or reservoir reactors, comprise means for adding the various reagents needed for the reaction which are often complex, voluminous and costly and in addition do not bring homogenous distribution of these reagents inside the reactor and therefore no optimal control over the reactions. This is the case in particular for reactors in which oxidation of substances is conducted in an aqueous medium, and in which the air required for the reaction is collected then compressed and finally injected into the medium. The compression of air makes a major contribution to the high cost of the process, and molecular oxygen is distinctly less active than oxygen in atomic form.

It is in order to eliminate said means for adding the reagents that reactors have been developed in which the essential reactive species are generated in situ by electrochemical means in a subcritical or supercritical aqueous medium.

Therefore, document U.S. Pat. No. 4,581,105 relates to an electrochemical cell containing an aqueous electrolyte under supercritical conditions. The electrolyte solution contains at least one species, so-called "electroactive species" which, when a current is applied to the electrodes, reacts to give "electrochemical products" soluble in the supercritical fluid, and to minimize the quantities of energy consumed by promoting mass transfers of the reagents and products to and from the electrodes.

In the anode and cathode compartments, which are generally separated by a separator element, oxygen and hydrogen may be generated, for example in water.

Document EP-A-0 535 3 20 concerns a process for oxidizing organic and inorganic substances of aqueous waste. In this process, the substances to be treated are firstly stored and optionally mixed in a reservoir, and are then directed by means of a high pressure pump into an electrolysis zone situated immediately before or in the reaction zone itself.

According to the figure illustrating this patent, the electrolysis zone is located at the inlet to the reactor.

Before entering the electrolysis zone, the substances to be treated are brought to a temperature close to the critical temperature of water, namely 374° C. In the electrolysis zone, the generated oxygen initiates the oxidation reactions. Owing to the exothermal nature of these reactions, the reaction mixture heats up to a temperature possibly reaching 650° C. This temperature is maintained, in the reaction zone, until occurrence of the desired degradation of the compounds placed in the electrolysis zone. The mixture which leaves the reactor then imparts its heat to a heat exchanger, the gaseous and liquid phases are released from pressure, separated and, optionally, submitted to subsequent treatment.

This document which uses a single reactor, apparently of large volume, to treat solely aqueous waste essentially containing organic compounds, in no way raises the problems related to the precipitation and depositing of salts, or to corrosion.

A need therefore exists for a process and a device to convert chemical structures or substances, in particular in a supercritical medium, which among others do not have precipitation, salt depositing or corrosion problems, which avoids the use of reagents, outside additives, and with which it is possible to obtain full, total conversions, reactions within a reduced volume, with sufficiently rapid kinetics.

The purpose of the present invention is therefore to provide a process and a device which, among others, simultaneously meet all the above-indicated needs, which do not have the disadvantages, limitations, defects and drawbacks of the processes and devices of the prior art, and which solve the problems raised by the processes and devices of the prior art.

This purpose, and others, are achieved according to the invention by a process for converting at least one chemical structure in a fluid under pressure and at temperature containing a solvent and at least one salt, in which said fluid is formed in the lower part of a first vertical reactor, so-called "reservoir reactor" and flows upwards in said reservoir reactor successively crossing through:

a first lower zone in which said fluid is maintained under first conditions of temperature and pressure ensuring high solubility of the salt or salts, and in which it undergoes electrolysis in order to generate in situ at least one reactive species and initiate said conversion, then a second upper zone in which said fluid is maintained under second conditions of temperature and pressure leading to a precipitation of the salt or salts, and in which said conversion is continued;

after which the said salt(s) precipitate and fall into said lower zone where it(they) resolubilize and saturate the fluid submitted to electrolysis:

the said fluid essentially free of salt being evacuated to the upper part of said first reactor and being directed into a second reactor, so-called "tubular" reactor, maintained under third conditions of temperature and pressure enabling the desired stage of advancement of the conversion to be obtained.

The process of the invention brings a solution to all the problems mentioned above and meets all the needs indicated above.

Owing to the combination of two specific reactors, one of reservoir type and the other of tubular type, in which the conversion or reaction reaches the desired stage of advancement, the size of said reservoir reactor may be considerably decreased, which reflects positively on the overall cost of the process.

Also, the reservoir reactor, associated with the tubular reactor, is also a specific vertical reactor which comprises two superimposed zones: a lower zone, acting as electrolysis zone, and an upper zone acting as precipitation zone for the salts and in which the major part of the reactions involved takes place.

The combination of the two specific reactors, according to the invention, solves the problems related to salt precipitation and corrosion.

The salts and optionally the solid particles are efficiently separated in the reservoir reactor and the stream of fluid sent into to the tubular reactor is essentially salt free and optionally free of solid particles; likewise, the major part of the corrosive compounds possibly present in the stream of fluid is also eliminated in the reservoir reactor. The result is that the role of the tubular reactor is practically only to reach the desired stage of conversion, whether partial or full, and it is not submitted to the action of any salt or other corrosive compound. No particular measures have been provided therefore in order to limit the depositing of these salts or corrosion.

In addition, only the reservoir reactor and, preferably, only the lower zone, which is in contact with corrosive species, must be preferably made in a material which restricts corrosion. Also, the specific structure of the vertical reservoir reactor of the process according to the invention makes it possible both to precipitate and to separate the salts and to use them in the electrolysis zone to increase the efficiency of the reactions taking place therein. The salts which precipitate in the upper supercritical zone fall under the effect of gravity, owing to the vertical arrangement of the reactor, into the lower zone or electrolysis zone in which they resolubilize and therefore permanently saturate the fluid in the electrolysis zone.

On this account, the fluid in the electrolysis zone shows major, regular conductivity, and the efficiency of electrolysis and consequently of the production of active species as well as the yield and kinetics of the initiated reactions are strongly increased.

It is one of the surprising effects and advantages of the process of the invention that advantage is taken of the elimination of the salts to optimize the production of active species.

In other words, by means of the process of the invention the problems of corrosion and salt management are simultaneously solved as is the problem concerning the addition of the additives, and in surprising manner the generation of active species is improved by using precisely these salts as electrolytes.

The quantity of salts, corresponding to the salts non resolubilized in the lower zone, settle in the bottom of the reservoir reactor and may be recovered continuously or in cycles.

In addition to these surprising advantages, it is to be noted that the process of the invention offers all the effects and advantages related to the fact that the chemical reaction is conducted under pressure and at temperature in a supercritical medium for example, and all the advantages and effects related to the in situ production of the species by electrolysis, that is to say in particular a homogeneous distribution of these species throughout the entire fluid, the production of much more reactive species, etc.

Moreover, as seen above, the elimination of the salts via a veritable synergistic effect leads to a significant increase in the production of active species.

In other words, the process of the invention combines, in surprising manner, the effects and advantages of each of its component elements without having any of their defects or disadvantages: hence the reservoir reactor has its size reduced and optimized, the tubular reactor, owing to its position downstream from the reservoir reactor, makes it possible to reach the desired stage of conversion without difficulty, and for example to fully complete the reaction without suffering the harmful effects of salt deposits and corrosion, and finally the salts are separated, corrosion avoided, and the reaction optimized due to the specific structure of the reservoir reactor: vertical, and in two zones, the lower zone being used to produce the active species in situ and highly efficiently by taking advantage of the electrolyte formed by the solubilisation of the salts without it being generally necessary to add the slightest additive or outside reagent requiring often complex devices.

By fluid under pressure and at temperature is generally meant a fluid whose temperature and pressure are greater than its normal pressure and temperature, namely 25° C. and 1 bar (0.1 MPa).

It is to be noted in the remainder of this description that the supercritical conditions, defined relative to pressures and temperatures at the critical point: Pc and Tc, are also defined relative to the entire fluid. The latter may be made up of a group of reagents, additives and active species, and if the fluid is formed of a complex mixture the critical coordinates of the fluid may be ill known. However, as a first approximation, for such a fluid, it can be considered that the Pc and Tc values of the fluid are very close to the Pc and Tc values of the solvent having majority presence in the fluid or of the binary, tertiary mixture etc. having majority presence in the fluid, and in this case reference is made to the critical coordinates of the said solvent to define the supercritical domain.

According to the invention, three operating domains can generally be defined for the fluid under pressure and at temperature:
 a supercritical domain in which the pressure and temperature are, respectively, greater than Pc and Tc;
 a subcritical domain for which the dense liquid phase is not in equilibrium with a gas phase, that is to say all the gases are dissolved in the liquid phase;
 a diphase subcritical domain in which a liquid phase and a gas phase coexist in equilibrium.

Therefore, in the remainder of the description the fluid "under pressure and at temperature" is generally in one of three domains defined above.

The pressures and temperatures of the above operating domains are generally in the ranges of 0.5 to 60 Mpa and 50 to 600° C. respectively.

By way of example, if the fluid is an aqueous fluid, the water has a critical point defined by Tc=374° C. and Pc=22.1 MPa, therefore under supercritical conditions the pressure of the process will be greater than Pc and the temperature greater than 374° C.

The various conditions of temperature and pressure are, moreover, adjusted in the different phases of the process relative to the operations conducted during these different phases. Therefore, in the lower zone said first conditions of temperature and pressure are essentially conditions ensuring high solubility of said salt or salts—namely, for example, from 1 to 10 g/l, in particular in the case of a fluid which is a saline aqueous fluid—but these conditions are also optimized to ensure the best compromise possible between good conductivity of the fluid, such as a saline aqueous solution, related to said solubility of the salts, good solubility in the fluid of the chemical structures to be converted and of the reaction products, and good initiation of the conversion it is wished to perform from a kinetics viewpoint.

Generally, the pressure in the lower zone is 0.5 to 60 MPa and the temperature is 25° C. or over but lower than the temperature at the critical point (Tc). Preferably, said first conditions of temperature and pressure are subcritical conditions. These conditions are in particular those prevailing in the first zone in the case when the fluid is a saline aqueous solution. It is to be noted that if the temperature in the first zone is greater than the temperature at the critical point, the conductivity of the fluid generally becomes practically zero and no longer enables electrolysis, for example the electrolysis of water, to take place under good conditions.

In the second zone, or upper zone of the reservoir reactor, the fluid is maintained under conditions of temperature and pressure leading to a precipitation of the said salt or salts.

Said precipitation generally corresponds to a solubility—in particular if the fluid is a saline aqueous solution—of less than 100 ppm, for example of 1 ppb to 100 ppm.

Generally, provision is also made so that the limit of solubility of the said salts under these second conditions of pressure and temperature corresponds to the quantity of salts it is desired to collect at the outlet. In parallel, these conditions of pressure and temperature must also ensure the solubility of the chemical structures which remain to be converted and the solubility of the reaction products, and must enable the desired conversion or reaction to be extended. Generally, the pressure is 0.5 to 60 MPa and the temperature from 200 to 600° C., in particular for saline aqueous waste. Preferably the second conditions of temperature and pressure are supercritical conditions. The third conditions of pressure and temperature are generally situated within the same ranges of pressure and temperature as said second conditions of pressure and temperature. Preferably, these third conditions of temperature and pressure are supercritical conditions but may optionally be different to the second conditions of temperature and/or pressure.

In particular, from the foregoing and owing to the fact that the pressure may be maintained constant throughout the entire process, said conditions of temperature and pressure only differ in temperature, the pressure being maintained constant throughout the entire process, and preferably being a pressure greater than the pressure at the critical point Pc. On this account, the pressure being constant, the temperature in the upper zone is a temperature enabling precipitation of the salt or salts, the temperature in the lower zone is a temperature ensuring high solubility of the salts, and the third temperature in the tubular reactor is a temperature optionally different from said first and second temperatures but is, however, generally greater than the second temperature (generally Tc).

By chemical structure is generally meant, according to the invention, any chemical edifice, that is to say any association of atoms or molecules, whether solid, liquid or gaseous.

This chemical structure may be of organic type, such as for example heavy oils, aromatic compounds, etc., or of inorganic or mineral type, such as for example nitrates, metal acetates, hydroxide sludge, etc.

The conversion produced in the process of the invention may concern only one of these chemical structures or several of the latter. Moreover, the chemical structure(s) affected by the conversion may also be chemical structure(s) forming part of the solvent and/or salt present in the fluid.

By chemical conversion or reaction is generally meant, according to the invention, any modification affecting the chemical structure. It may for example concern a degradation of the molecular or atomic edifice of the said chemical structure(s) into one ore more chemical structures with a simpler molecular or atomic edifice, it may also concern the interaction of the different chemical structures between themselves. These conversions may be any one or more of known reactions in organic or inorganic chemistry such as cleavage, condensation, addition, substitution, elimination, reduction, oxidation, etc.

According to the invention, the fluid contains a solvent, this solvent forms the essential part of the fluid, and the salt(s) and chemical structure(s) are generally in solution or suspension in this solvent.

This solvent is generally chosen from among the liquid or gaseous compounds under normal conditions of temperature and pressure.

Therefore, the solvent may generally be chosen from among water, known organic solvents, liquids under normal conditions of temperature and pressure, and their mixtures.

The solvent may therefore be chosen from among the liquid alkanes with 5 to 20 C, such as n-pentane, isopentane, hexane, heptane, octane; liquid alkenes with 5 to 20 C; liquid alkynes with 4 to 20 C; alcohols such as methanol, ethanol; ketones, such as acetone; ethers; esters; liquid chlorine- and/or fluorine-containing hydrocarbons; solvents derived from petroleum cracking, such as white spirit; the other organic solvents; and their mixtures.

The solvent may also be chosen from among the gaseous compounds under normal conditions of temperature and pressure, and their mixtures, among which mention may be made of carbon dioxide, helium, nitrogen, nitrous oxide, sulphur hexafluoride, gaseous alkanes with 1 to 5 carbon atoms: methane, ethane, propane, n-butane, isobutane, neopentane, gaseous alkenes having 2 to 4 carbon atoms: acetylene, propyne and butyne-1; gaseous dienes such as propadiene; gaseous chlorine- and/or fluorine-containing hydrocarbons, for example chlorofluorocarbons, so-called "Freons" and also called CFCs or HCFCs, etc., and their mixtures.

In preferred manner, the process of the invention can be used to treat aqueous waste and the solvent is therefore water, and the fluid may be defined as a saline aqueous solution, possibly containing organic and/or mineral compounds.

According to the invention, said fluid contains at least one salt.

This salt is chosen for example from among the salts of metal and metalloid cations with an anion chosen from among the chloride, nitrate, acetate, sulphate, bromide, fluoride, carbonate, bicarbonate, etc. These salts are, for example, salts found in waste, in particular the aqueous waste from various industrial processes, such as nitrates, sulphates, etc.

According to the invention, a fluid containing at least one said structure to be converted, a solvent and at least one salt is formed in the lower part of the reservoir reactor. It is important to note once again that the structure(s) to be converted may either be structure(s) different from the solvent and the salt (in the majority of cases) or the solvent and/or the salt themselves.

To form the fluid, the salt, the solvent and the chemical structure(s) to be converted may each be added separately to the lower part of the reservoir reactor, but two elements or more from among them may be added simultaneously to the reservoir reactor, for example in the form of a stream of fluid.

Preferably, to form the fluid, a single stream of fluid, containing both the salt, the chemical structure and the solvent, is added to the lower part of the reservoir reactor. It may for example be saline waste, for example an aqueous saline waste (the fluid is then a saline aqueous solution) possibly containing organic and/or mineral compounds to be converted, preferably to be degraded.

This saline, aqueous waste or solution may be acid or basic, therefore the process of the invention applies both to basic saline aqueous solutions and to acid saline aqueous solutions and more generally to any aqueous solution allowing the flow of current.

The stream of fluid or waste may also contain only the solvent and the chemical structure, the salt being added separately, preferably previously to the reservoir reactor, for example by filling the bottom of the reactor with salt: that is to say that at the start of the process a sufficient load of salt for electrochemistry is placed in the reactor, this salt is not consumed by the process and is confined within the reservoir reactor, in its lower part.

Also, according to one variant of the process of the invention, the fluid may contain no salt and be non-conductive; in this case the fluid—such as an aqueous solution that is neither saline, nor acid, nor basic—is made conductive in the lower part of the reservoir reactor by a polymer membrane or a solid electrolyte of ionic conductor type allowing the flow of current between the anode and the cathode.

The process of the invention therefore finds general application and can be used to treat all types of waste whether or not they contain a salt. It is also possible to add a gas such as $CO_2$ or a liquid such as ethanol to said fluid or to said stream of fluid, such as a saline aqueous solution, in order to lower the critical coordinates.

The process of the invention is generally conducted without the use of any reagent. However, in some cases, it may prove to be advantageous to add to the fluid at least one additional reagent, that is to say different from the above-defined chemical structure(s) and from the solvent and different from the compound lowering the critical coordinates, this reagent being chosen for example from among the oxidizing compounds such as molecular oxygen and hydrogen peroxide $H_2O_2$.

The additional reagent may also be chosen from among the reducing compounds, such as molecular hydrogen, hydrazine, lithium borohydride and sodium borohydride.

Moreover, in addition to electrolysis, the fluid may be submitted to another form of activation, for example to the action of ultrasound in the lower and/or upper zone of the reservoir reactor.

According to the invention, the fluid is formed (generally by passing a single stream of fluid) in the lower part of a first reactor called a "reservoir reactor".

Also, according to the invention, the size of the reservoir reactor is optimized by the presence of the tubular reactor in which the reaction is completed, that is to say that its size is markedly smaller than that of the reservoir reactors in processes using only a reservoir reactor.

The size of this reservoir reactor is determined such that the stay time in this reservoir reactor is sufficient for all the salts to precipitate and for most of the conversions involved to reach a sufficient stage of advancement. In particular, the lower zone of the reservoir reactor, or electrolysis zone, is sized such that the contact surface between the fluid, in particular the saline aqueous solution, and the electrodes is sufficient to conduct the desired electrochemical conversion in relation to the parameters of temperature and pressure.

Also, the upper part of the reservoir reactor is sized essentially so that it may allow the precipitation of the salts.

By formation in the lower part is generally meant that the fluid is formed in the lower half of the reactor, that is to say that the stream of fluid is added to the lower half of the reactor, therefore for a cylindrical reactor this addition may be made at the base of the reactor or in the side wall.

According to the invention the reservoir reactor is arranged vertically, this special arrangement of the reactor is fundamental to enable precipitation, settling, re-solubilisation and evacuation of the salts and, optionally, of the particles in suspension under the action of gravity in accordance with the process of the invention.

According to the invention, the fluid formed in the reactor flows upwards in the reservoir reactor and crosses firstly through a first lower zone, this lower zone generally representing from ⅓ to ⅔ of the reactor, for example half of the reactor. The conditions of temperature and pressure prevailing in this first lower part have already been defined above.

The lower zone is also an electrolysis zone, that is to say that it forms a conventional electrolysis cell which comprises an anode and a cathode connected to a current generator between which, owing to the high solubility of the salts in the fluid in the subcritical state, these salts ensure substantial, regular conductivity of the fluid.

The active species produced in the lower zone are, generally, derived from the electrolysis, the decomposition of the solvent, therefore in the case of water it is decomposed into hydrogen and oxygen.

Generally, the process of the invention can also be used—in addition to electrolysis of the solvent—to convert electrochemically one or more chemical structure(s) of the fluid—such as a saline aqueous solution—at the cathode or the anode, in order to obtain one or more electrochemical products, by means of the salts already present, or resolubilized, which ensure the conductivity of the solution.

The active species generated in situ, in the very core of the reactor, are for the most part much more active species than species added from outside which are generally molecular species. The conversions of the chemical structures, for example of the organic or inorganic matter present in the fluid are initiated in this zone; it may for example concern the reaction of nascent oxygen which starts to react on the organic or inorganic matter to be oxidized.

Therefore when the solvent is water and when the treated fluid is therefore a saline aqueous fluid or a saline aqueous solution, electrolysis leads to decomposition of the water, and the conversion of the chemical structures may be an oxidation reaction of the chemical structure using the $O_2$ generated in the electrolysis zone through the presence of the salts that have been brought or solubilized and which ensure the conductivity of the solution. This generated oxygen species is a much more reactive species than molecular oxygen $O_2$.

Like any other conversion of reaction, the oxidation reaction initiated in the electrolysis zone, continues in the upper zone of the reservoir reactor and reaches the described stage of conversion, partial or full, in the tubular reactor.

The electrolysis zone may be a single zone, but it may also be separated, in particular for saline aqueous waste, firstly into a cathode compartment and secondly into an anode compartment, which makes it possible—in the case of water—to separate the oxygen formed in the anode compartment from the hydrogen formed in the cathode department.

Therefore, the conversion may be a reduction reaction which occurs in the cathode compartment, for example by means of the hydrogen generated in situ in this cathode compartment which, in this case, is connected to the upper zone of the reservoir reactor, itself connected to a tubular reactor. The reduction reaction initiated in the cathode compartment of the lower electrolysis zone continues in the upper zone of the reservoir reactor and reaches the desired stage of advancement, full or partial, in the tubular reactor. In this case, the tubular reactor may contain a catalyst bed.

The reduction reaction may also be electrocatalysed at the cathode through the use of a surface electrode of a suitable kind, for example in platinum.

Said reactions or conversions, oxidation and reduction for example, which are respectively produced in the anode and cathode compartments, may be conducted simultaneously and a tubular reactor may then be connected to each of the anode and/cathode compartments which therefore extend over the entire lower and upper zones of the reservoir reactor. The tubular reactor connected to the outlet of the cathode compartment possibly containing, as indicated above, a catalyst bed and the reduction reaction possibly being electrocatalysed at the cathode.

It is possible to add to each of the anode and cathode compartments an additional reagent chosen respectively from among the oxidizing compounds ($H_2O_2$, molecular $O_2$) and reducers (hydrazine).

After the above-described lower zone, the fluid then passes into the upper zone. In this zone, the reactions and conversion, initiated in the lower zone, are continued and some are completed: this is the case in particular for the elimination of halogen-containing compounds and compounds containing S and/or P atoms which are totally destroyed before they leave the reservoir reactor. Under the conditions of the process of the invention, the bonds involving halogens, in particular the C—Cl bond, can be easily hydrolysed, fragment and may in particular undergo a nucleophilic substitution reaction, such reaction starting for example at subcritical temperature and ending before the fluid leaves the reservoir reactor.

Therefore, in particularly advantageous manner according to the invention, the halide $X^-$ anions, such as chloride, bromide, iodide, fluoride, and the anions containing S and/or P atoms, such as sulphates or phosphates, may precipitate with other cations present in the medium and be easily separated with the remainder of the salts. The precipitated salts, optionally accompanied by solid particles which settle in the lower part of the reservoir reactor, are collected and, optionally, evacuated continuously or per operating cycle.

In the upper supercritical zone, the solubility of the salts is extremely reduced and may range from 1 ppb to 100 ppm. They therefore precipitate and fall under the effect of gravity into the lower zone where they re-solubilize.

In the upper part of the reactor, that is to say towards the top of the reactor, an essentially salt-free fluid is evacuated. By an essentially salt-free fluid is meant a fluid which contains only a very low concentration of salts corresponding to the solubility limit, at the temperature and pressure of the medium.

Likewise, at the outlet of the reactor, the stream of fluid is essentially free of halogen-containing compounds.

The tubular reactor, according to the process of the invention, receives neither salts, nor corrosive compounds and its sole role is to reach the desired stage of advancement of the conversion, that is to say, for example, to complete the conversion(s) and reaction(s) unfinished in the reservoir reactor. It may therefore be made in a conventional "non-special" material, in stainless steel for example.

According to the invention, it is possible to treat fluids such as saline aqueous solutions which could not be treated by a tubular reactor alone.

The tubular reactor, according to the invention, is also under pressure and at temperature, in particular under supercritical conditions.

According to the invention, the fact that the desired stage of advancement of the conversion is reached, that is to say for example that the conversions, reactions are completed in a separate reactor independent from the main reservoir reactor, unlike the prior art in which a single reactor is used to conduct the entire reaction, means that it is possible to fix operating conditions in this reactor which may be different from those prevailing in the reservoir reactor; it is therefore possible to operate in the tubular reactor under better conditions with which it is possible to obtain the desired stage of advancement of the conversions or reactions, for example full completion of the reactions. It is also possible to define the conditions which orient the reactions towards a given end product, preferably a product that can be give further use.

Therefore in the tubular reactor, for example, the fluid is also maintained under supercritical conditions, but preferably more "remote" from the critical point than the conditions in the upper part of the reservoir reactor: that is to say with pressures and/or temperatures greater than those prevailing in the upper zone of the reservoir reactor.

By way of example, in the case of aqueous fluids, the temperature in the tubular reactor may range from 200 to 600° C. and pressure from 5 to 60 MPa.

In connection with the foregoing, the sizing of the tubular reactor for the treatment of a fluid, for example a saline aqueous solution, is dependent upon the parameters of temperature, pressure and stay time. Therefore, when operating with a fixed volume, for example with a standard or existing tubular reactor, of fixed length, the desired stage of advancement of the conversion may be obtained by optimizing the P and T parameters. Conversely, if pressures and temperatures are imposed, it is possible to vary the volume, that is to say that it is possible to adapt several lengths of tubular reactor at the exit of the reservoir reactor. Finally, it is also possible to vary the three parameters (P, T and volume).

The present invention also concerns an installation to implement the process of the invention such as described above.

The installation, according to the invention, is an installation for converting at least one chemical structure present in a fluid containing a solvent and at least one salt.

The installation of the invention comprises:
 a vertical reactor, called "reservoir reactor" comprising a first lower zone in which the fluid is maintained under first conditions of temperature and pressure ensuring high solubility of the salt(s), and a second upper zone in which said fluid is maintained under second conditions of temperature and pressure leading to a precipitation of the salt(s), said reservoir reactor being equipped with means to maintain said fluid in said lower zone under said first conditions of temperature and pressure, and means for maintaining said fluid in said upper zone under said second conditions of temperature and pressure, and electrolysis means provided in the lower zone, and means for forming said fluid in the lower part of said reservoir reactor;
 a second reactor, called a "tubular reactor" equipped with means for maintaining the fluid under third conditions of temperature and pressure with which it is possible to reach the desired stage of advancement of the conversion, connected to the upper part of said reservoir reactor.

The reservoir reactor has already been described above in connection with the process in respect of its characteristics of volume and size in particular; this reactor may be made in any suitable material able to withstand the conditions of temperature and pressure prevailing in the reactor, for example the reactor may be in conventional stainless steel. Advantageously, according to the invention, only the reservoir reactor and preferably only its lower zone, in contact with corrosive species, and in which there is a strong presence of salts, needs to be made, preferably, in a material which limits corrosion or else is lined with such a material, chosen for example from among the noble metals such as titanium, platinum, gold and oxides such as alumina $Al_2O_3$ or zirconium $ZrO_2$.

The means for maintaining the fluid in the lower zone, under said first conditions of temperature and pressure, subcritical conditions for example, may for example comprise firstly means for maintaining a pressure for example in the entire reactor and, secondly, means for maintaining a first temperature in the lower zone of the reservoir reactor.

These means may, for example, comprise a high pressure pump intended to pressurize the stream(s) of fluid before they are added to the reservoir, and a heat exchanger intended to bring the stream(s) of fluid into the desired temperature domain in the lower zone of the reservoir reactor.

The heat exchanger may be provided, for example, downstream from said high pressure pump.

The means for maintaining the fluid in the second upper zone, under said second conditions of temperature and pressure, supercritical for example, may, for example, in similar manner comprise, firstly, means for maintaining a pressure, for example greater than the pressure at the critical point (Pc) in the entire reactor, already described above, and secondly means for maintaining a second temperature, for example greater than the temperature at the critical point, in the upper zone. It is to be noted that these latter temperature maintaining means may be omitted, since owing to the general exothermal nature of the conversion or chemical reaction initiated in the lower zone, the fluid or reaction mixture heats and a vertical temperature gradient is set up in the reservoir reactor, so that the temperature in the upper zone may rise beyond the fluid's temperature at the critical point. However, and according to one particularly advantageous embodiment of the invention, the means for maintaining a first temperature in the lower zone of the reservoir reactor and/or the means for maintaining a second temperature for example greater than Tc in the upper zone of the reservoir reactor may be formed by the tubular reactor itself, for example coiled around all or part of the reservoir reactor, for example around the upper zone of the reservoir reactor. On this account, calorific exchanges are made possible. These two reactors, in particular the tubular reactor, will therefore impart part of its heat to the fluid present in the reservoir reactor. Such an arrangement proves to be particularly advantageous from the viewpoint of energy savings.

Said means for maintaining said fluid in the lower zone under the first conditions of temperature may also be formed by cooling means such as a refrigerant, and said means for maintaining said fluid in the upper zone under second conditions of temperature may be formed by heating means such as one or more heating elements, and vice-versa.

Finally, the means for maintaining said fluid in the lower zone of the reservoir reactor under said first conditions of temperature and/or the means for maintaining said fluid in the upper zone under said second conditions of temperature may be formed of a tube for the supply of the stream of fluid, in particular a single fluid stream, such as a saline aqueous solution, coiled around all or part of the reservoir reactor for the purpose firstly of heating the fluid stream before its injection into the reservoir reactor, and secondly of removing the calories generated within the reservoir reactor.

Said electrolysis means generally comprise electrodes, anode and cathode, connected to a current source or generator. The shape of the electrodes is generally the shape best suited to the geometry of reservoir reactor, to the circulation of the fluid in the reactor, and to the flow of current, these electrodes are therefore generally in the shape of wires, cylinders, grids, plates, concentric cylinders, and likewise these electrodes may be formed by the walls of the reservoir reactor. For example, the anode may be formed by a wire and the cathode by the shell of the reservoir reactor or conversely. The electrodes are generally made in a material suitable for the treated fluid, therefore the electrodes are for example in Pt, Au or any other suitable conductor material. The surface of the electrodes and the other conditions of electrolysis, such as voltage and intensity may be easily determined by those skilled in the art.

It is to be noted, as already mentioned, that according to the invention the flow of current and electrolysis are made possible by the presence of salts between the electrodes.

Separating means may be provided to separate the lower zone and, optionally, the upper zone of the reservoir, into a cathode compartment and an anode compartment.

The means for forming said fluid in the lower part of the reservoir reactor generally comprise means for adding at least one stream of fluid, preferably a single stream, into the lower part of the reactor. It is generally a pump or other means, the pump as indicated above preferably being a high pressure pump used to maintain the reservoir reactor at a pressure, for example greater than the pressure at the critical point Pc.

The tubular reactor has already been described above, in connection with the process in respect of its volume and size characteristics. This tubular reactor is, according to the invention, placed in series with the reservoir reactor and is connected to its upper part by a pipe or other means.

The installation according to the invention may also comprise means, provided in the lower part of the reservoir reactor, to collect and optionally evacuate the settled salts and solid particles, either continuously or per operating cycle.

These means may, for example, consist of means to inject a flow or stream of pure solvent, such as water, free of salt into the lower part of the reactor, and of means to evacuate the flow of solvent containing salt. The elimination of the salts precipitated to the bottom of the reactor by rinsing or washing with a flow of solvent, such as pure water, may preferably be conducted continuously or in cycles.

Advantageously, means for generating ultrasound, such as probes, may be provided in the lower and/or upper zone of the reservoir reactor.

Means for modifying the flow and, in particular, for promoting the settlement of salts and solid particles, such as deflectors, plates or baffles may be provided in the upper and/or lower part of the reservoir reactor.

These means for modifying flow may be formed by the electrodes themselves used for electrolysis in the lower zone of the reservoir reactor, for example coiled around each other to promote piston type flow.

The characteristics and advantages of the invention will be more clearly seen on reading the following description. This description, given for illustration purposes and non restrictive is made with reference to the appended drawing in which.

Figure 1:
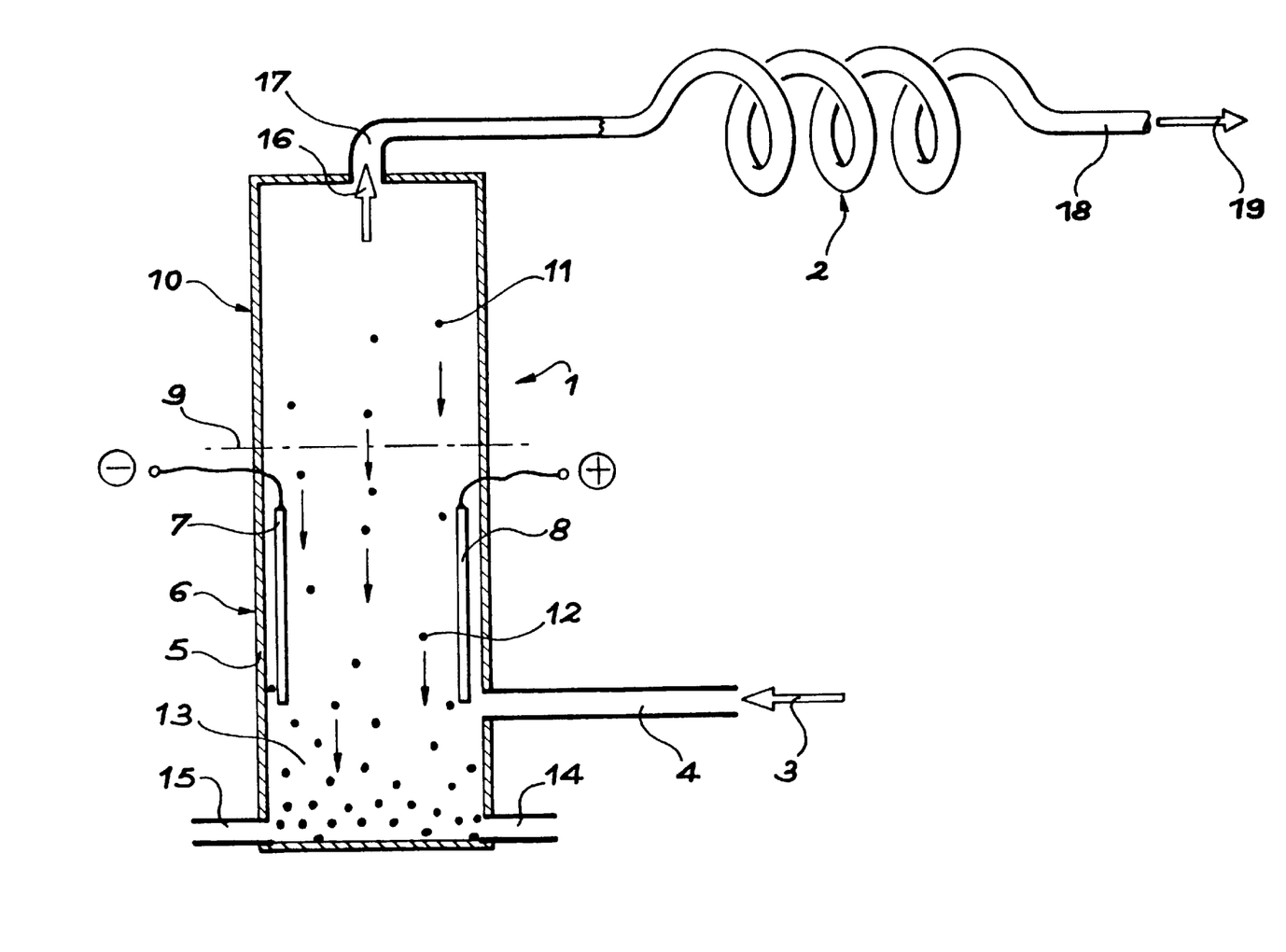
FIG. 1 shows a cross section diagram of an installation according to the invention.

In FIG. 1 an installation is therefore shown according to the invention which is more particularly adapted to the treatment of aqueous waste whether saline or not.

According to the invention, this installation essentially comprises a reservoir reactor 1 and a tubular reactor 2 which are associated in series.

The waste to be treated (arrow 3) derived for example from a storage reservoir, a high pressure pump and a heat exchanger (not shown) enters into the lower part of the reservoir reactor 1, positioned vertically, via an inlet 4 provided here in the side wall 5 of the reservoir reactor. The latter is shown in FIG. 1 in the form of a cylinder whose diameter is equal to approximately one third of its height. The waste crosses firstly through the lower zone 6 of the reservoir reactor which forms an electrochemical cell fitted with two electrodes, shown here in the form of metal plates 7, 8, connected to a current generator. The pressure, in the lower zone, is in the order of 25 MPa, while the temperature is in the region of approximately 350° C.; at this temperature the salts make the solution conductive between the two plates and the water is decomposed into oxygen and hydrogen. The nascent oxygen starts to react on the chemical substances to be oxidized which are of organic and/or inorganic matter and which, for example, contain chlorine compounds with in addition a high COD. The waste then passes into the upper zone (beyond the limit 9 which may or may not be materialized), in which the fluid is in the supercritical state, that is to say that the pressure is in the order of 25 MPa and the temperature from 374° C. to 600° C. In this upper zone, the oxidation reaction intensifies and the salts precipitate 11 and fall 12 towards the bottom of the reactor. In the subcritical zone 6, they re-solubilize and saturate the solution between the metal plates 7 and 8, the production of oxygen is therefore optimal; the non-resolubilized salts and the solid particles settle in the bottom 13 of the reactor. Means for collecting, and optionally evacuating the salts and solid particles, in the shape of evacuation openings 1, 15 for example are provided in the base of the reactor.

The waste which no longer contains any salts, or only a very low concentration thereof corresponding to the solubility limit at the temperature and pressure of the medium, leave the reactor (arrow 16) via pipe 17 positioned at the top of reservoir reactor 1. This waste also no longer contains any halogen compounds which were eliminated in the supercritical zone 11.

The waste is given final treatment in reactor 2, and is then evacuated from the installation via pipe 18 (arrow 19) and is then generally reduced to normal pressure and temperature and submitted to gas/liquid separation. The gaseous products, or end liquids, are either discarded or given further use if they are of industrial interest.

Evidently, the installation in FIG. 1 may comprise means for adjusting flow, pressure, temperature etc., and sensors, waves, flowmeters and other equipment in particular for the measurement of the various fluid parameters.

What is claimed is:

1. A process for converting at least one chemical structure into at least one end product, wherein the at least one chemical structure is in a fluid containing a solvent and at least one salt, wherein said fluid is formed in the lower part of a first vertical reservoir reactor and flows upwards in said first vertical reactor successively crossing through:

a first lower zone in which said fluid is maintained under a first temperature ensuring high solubility of said at least one salt and wherein said fluid undergoes an electrolysis to generate at least one reactive species in situ and initiate the conversion to the at least one end product, then a second upper zone wherein said fluid is maintained under a second temperature for precipitation of said at least one salt, and in which said conversion to the at least one end product is continued;

after which said at least one salt precipitates into said lower zone wherein said at least one salt resolubilizes and saturates the fluid submitted to electrolysis;

wherein said fluid which is essentially free of salt is evacuated to the upper part of said first vertical reactor and is directed into a second tubular reactor, wherein said fluid is maintained under a third temperature, which enables the conversion to said at least one end product;

wherein the pressure is maintained constant throughout the entire process.

2. The process according to claim 1, wherein the temperature and pressure of the fluid which is formed in said first vertical reactor are greater than 25° C. and 1 bar.

3. The process according to claim 1, wherein said fluid which is formed in said first vertical reactor is under a pressure and a temperature which is one of a supercritical domain in which the pressure and temperature are respectively greater than the critical pressure and the critical temperature of the fluid; a subcritical domain in which a dense liquid phase is not in equilibrium with a gas phase and in which all the gases are dissolved in the liquid phase; or a diphase subcritical domain in which a liquid phase and a gas phase coexist in equilibrium.

4. The process according to claim 3, wherein the pressure and temperatures of the domains are, respectively, from 0.5 to 60 MPa and from 50 to 600° C.

5. The process according to claim 1, wherein said solvent is a liquid or gaseous compound at 25° C. and 1 bar.

6. The process according to claim 5, wherein the solvent is selected from the group consisting of water, liquid alkanes with 5 to 20 C., liquid alkenes with 5 to 20 C., liquid alkynes with 4 to 20 C., alcohols, ethers, esters, liquid chlorine-containing hydrocarbons, liquid fluorine-containing hydrocarbons, liquid fluorine- and chlorine-containing hydrocarbons, solvents derived from petroleum cracking, organic solvents and mixtures thereof.

7. The process according to claim 5, wherein the solvent is selected from the group consisting of carbon dioxide, helium, nitrogen, nitrous oxide, sulphur hexafluoride, gaseous alkanes with 1 to 5 carbon atoms, gaseous alkanes with 2 to 4 carbon atoms, gaseous dienes, gaseous chlorine-containing hydrocarbons, gaseous fluorine-containing hydrocarbons, gaseous fluorine- and chlorine-containing hydrocarbons, and mixtures thereof.

8. The process according to claim 1, wherein said salt is a metal salt with an anion selected from the group consisting of chloride, nitrate, acetate, sulphate, bromide, fluoride, carbonate and bicarbonate; or a metalloid cation with an anion selected from the group consisting of chloride, nitrate, acetate, sulphate, bromide, fluoride carbonate, and bicarbonate.

9. The process according to claim 1, wherein the at least one salt, the solvent and at least one chemical structure are each added separately to the lower part of the first vertical reactor to form the fluid.

10. The process according to claim 1, wherein two or more of the at least one salt, the solvent and at least one chemical structure are simultaneously added to the lower part of the first vertical reactor to form the fluid.

11. The process according to claim 10, wherein two or more of the at least one salt, the solvent and at least one chemical structure are added in the form of a stream of fluid.

12. The process according to claim 11, wherein a single stream of fluid containing the at least one salt, at least one chemical structure and the solvent is added to the lower part of the first vertical reactor.

13. The process according to claim 11, wherein said stream of fluid contains the solvent and the at least one chemical structure, and the at least one salt is added separately to the first vertical reactor.

14. The process according to claim 11, wherein the at least one salt is added before the solvent and the at least one chemical structure.

15. The process according to claim 1, wherein a gas or a liquid is added to the said fluid or said stream of fluid to lower the supercritical temperature and pressure of said fluid.

16. The process according to claim 15, wherein said gas is carbon dioxide.

17. The process according to claim 15, wherein said liquid is ethanol.

18. The process according to claim 1, wherein at least one additional reagent is added to the fluid.

19. The process according to claim 18, wherein said additional reagent is an oxidizing compound.

20. The process according to claim 18, wherein said oxidizing compound is molecular oxygen or hydrogen peroxide.

21. The process according to claim 18, wherein said additional reagent is a reducing compound.

22. The process according to claim 21, wherein said reducing compound is selected from the group consisting of molecular hydrogen, hydrazine, lithium borohydride and sodium borohydride.

23. The process according to claim 1, wherein in addition to electrolysis, said fluid is activated in one or both of the lower zone of the first vertical reactor and upper zone of the first vertical reactor by another form of activation.

24. The process according to claim 23, wherein the another form of activation is ultrasound activation.

25. The process according to claim 1, wherein said solvent is water and said fluid is a saline aqueous solution.

26. The process according to claim 25, wherein said at least one chemical structure is converted to at least one end product by an oxidation reaction of said at least one chemical structure, using the oxygen generated by electrolysis of the water.

27. The process according to claim 25, wherein the saline aqueous solution contains one or both of an organic compound and a mineral compound.

28. The process according to claim 1, wherein the lower zone of the first vertical reactor comprises an anode compartment and a cathode compartment.

29. The process according to claim 28, wherein said at least one chemical structure is converted to said at least one end product by a reduction reaction in the cathode compartment of said first vertical reactor.

30. The process according to claim 29, wherein said second reactor which is connected to the cathode compartment of said first vertical reactor contains a catalyst.

31. The process according to claim 29, wherein the reduction reaction is electrocatalysed at the cathode.

32. The process according to claim 29, wherein the reduction reaction utilizes hydrogen generated in situ in the cathode compartment of said first vertical reactor which is connected to the upper zone of the first vertical reactor and the second reactor.

33. The process according to claim 28, wherein an oxidation reaction in the anode compartment and a reduction reaction in the cathode compartment are simultaneously conducted, said anode and cathode compartments extending over the entire lower and upper zones of the first vertical reactor, and wherein said second reactor is connected to each of the anode and cathode compartments of said first vertical reactor.

34. The process according to claim 33, wherein said second reactor connected to the cathode compartment contains a catalyst.

35. The process according to claim 33, wherein the reduction reaction is electrocatalyzed at the cathode.

36. The process according to claim 28, wherein an oxidizing compound or a reducing compound is added to each of the anode and cathode compartments of said first vertical reactor.

* * * * *